(12) United States Patent
Yue et al.

(10) Patent No.: US 12,471,024 B2
(45) Date of Patent: Nov. 11, 2025

(54) SYSTEM AND METHOD FOR SAVING POWER AT Wi-Fi RECEIVER MODULES

(71) Applicant: HUAWEI TECHNOLOGIES CO., LTD., Guangdong (CN)

(72) Inventors: Huawei Yue, Shanghai (CN); Ju Yan Pan, Singapore (SG); Tingwu Wang, Shenzhen (CN); Yonggang Tian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 400 days.

(21) Appl. No.: 18/173,898

(22) Filed: Feb. 24, 2023

(65) Prior Publication Data

US 2023/0199660 A1    Jun. 22, 2023

Related U.S. Application Data

(63) Continuation of application No. PCT/CN2021/114598, filed on Aug. 25, 2021.

(30) Foreign Application Priority Data

Aug. 27, 2020 (SG) ............... 10202008283V

(51) Int. Cl.
*H04W 52/02* (2009.01)
*H04W 84/12* (2009.01)

(52) U.S. Cl.
CPC ........ *H04W 52/0245* (2013.01); *H04W 84/12* (2013.01)

(58) Field of Classification Search
CPC ........... H04W 52/0245; H04W 52/028; H04W 84/12
See application file for complete search history.

(56) References Cited

U.S. PATENT DOCUMENTS

| | | | |
|---|---|---|---|
| 2010/0202493 A1* | 8/2010 | Soliman | H04B 1/719 375/E1.001 |
| 2013/0210353 A1 | 8/2013 | Ling et al. | |
| 2013/0244665 A1* | 9/2013 | Clevorn | H04W 52/0245 455/226.1 |
| 2016/0127028 A1 | 5/2016 | Wang et al. | |
| 2016/0302150 A1 | 10/2016 | Palenius et al. | |

(Continued)

FOREIGN PATENT DOCUMENTS

| | | |
|---|---|---|
| CN | 103959674 A | 7/2014 |
| CN | 108029079 A | 5/2018 |

(Continued)

OTHER PUBLICATIONS

IEEE Std 802.11n-2009,Part 11: Wireless LAN Medium Access Control (MAC) and Physical Layer (PHY) Specifications, Amendment 5: Enhancements for Higher Throughput,dated Sep. 11, 2009, total 536 pages.

(Continued)

*Primary Examiner* — Jamal Javaid

(57) ABSTRACT

A receiver module that is communicatively connected to a plurality of Wi-Fi receiver chains is disclosed. The receiver module is configured to selectively switch the states of a plurality of Wi-Fi receiver chains between an "ON" state and an "OFF" state based on a signal quality parameter measured by each of these receiver chains.

16 Claims, 3 Drawing Sheets

(56) References Cited

U.S. PATENT DOCUMENTS

2017/0347319 A1* 11/2017 Lam .................. H04L 43/0817
2019/0124592 A1    4/2019 Pu et al.
2020/0100178 A1    3/2020 Kim et al.

FOREIGN PATENT DOCUMENTS

EP          2400799 B1    8/2018
JP       2016192821 A    11/2016

OTHER PUBLICATIONS

Minyoung Park et al. Status of Project IEEE 802.11ba, Wake-up Radio (WUR) Operation, Retrieved from the internet: http://www.ieee802.org/11/Reports/tgba_update.htm. On Dec. 16, 2019. total 8 pages.
International Search Report and Written Opinion issued in PCT/CN2021/114598, dated Nov. 15, 2021, 10 pages.
Extended European Search Report issued in EP21860451.0, dated Jan. 23, 2024, 11 pages.

* cited by examiner

SYSTEM AND METHOD FOR SAVING POWER AT Wi-Fi RECEIVER MODULES

CROSS-REFERENCE TO RELATED APPLICATIONS

This application is a continuation of International Application No. PCT/CN2021/114598, filed on Aug. 25, 2021, which claims priority to Singaporean Patent Application No. SG10202008283V, filed on Aug. 27, 2020. The disclosures of the aforementioned applications are hereby incorporated by reference in their entireties.

TECHNICAL FIELD

This invention relates to a receiver module that is communicatively coupled to a plurality of Wi-Fi receiver chains whereby the receiver module is configured to selectively switch the states of a plurality of Wi-Fi receiver chains between an "ON" state and an "OFF" state based on the signal quality parameters measured by each of these receiver chains.

BACKGROUND

During the reception of Wi-Fi signals by a Wi-Fi receiver, most of the power consumed by the receiver chip occurs at the Wi-Fi receiver chains. In particular, most of the power are consumed by the radio frequency (RF) modules contained within each of these receiver chains. As such, it has been proposed that if receiver chains at the physical (PHY) layer were to be switched off, i.e., be in an "OFF" state, when not in use, this would result in huge power savings for the receiver chip.

An existing power saving method that has been proposed by those skilled in the art is the wake-up scheduling method which involves the upper layers of the receiver chip, i.e., the data, network and transport layers. This method has to be implemented at both the transmitter and receiver sides as the receiver chip is constantly "listening" for a special signal to "wake-up". In operation, a Wi-Fi station (STA) is initially set to be in a lower power mode. In this lower power mode, the STA is constantly "listening" for a special signal whereby upon receipt of this special signal, the STA will switch from the lower power mode to its full power mode. When the Wi-Fi access point (AP) intends for the STA to operate in its full power mode, the AP will transmit a special signal, which is usually in the form of a predetermined type of frame, to the STA. Upon receiving this special signal, and upon operating in its full power mode, normal Wi-Fi transmission then takes place between the AP and the STA.

Another method that has been proposed by those skilled in the art makes use of the "SM power save mode" that is inherent in the current Wi-Fi 802.11n specification. For this method, the Wi-Fi station (STA) will send a signal via the request-to-send/clear-to-send (RTS/CTS) mechanism to the Wi-Fi station (STA), informing the STA that it is switching to a power saving mode whereby only a single receiver chain is in an "ON" state. Upon receiving this notification signal from the STA, the Wi-Fi access point (AP) will then configure itself such that it will only transmit signals that require only one receiver chain at the STA.

However, all the methods described above involve comprehensive processing steps at both the Wi-Fi station (STA) and the Wi-Fi access point (AP) whereby necessary signals are exchanged before the correct power mode is set at the STA. Additionally, the approaches adopted by those skilled in the art all utilize the upper layers of the receiver chip, i.e. the data, network and transport layers, and this requires additional processing to be performed by the receiver chip before the correct power mode is set for the receiver chip.

For the above reasons, those skilled in the art are constantly looking for a way to control the power mode at the receiver chip in the STA in an efficient manner while maintaining a good signal throughput between the AP and the STA.

SUMMARY

The above and other problems are solved and an advance in the art is made by the apparatus and methods provided by embodiments in accordance with the invention.

A first advantage of the embodiments in accordance with the invention is that by selectively turning off certain receiver chains at the physical (PHY) layer of a receiver chip at the STA, the receiver chip is able to conserve power effectively.

A second advantage of embodiments in accordance with the invention is that the power saving method may be invoked at the receiver chip quickly and efficiently as the invention will selectively cause the affected physical receiver chains to be in an "OFF" state without the need for signals to be exchanged between the AP and the STA.

According to a first aspect of the invention, a receiver module coupled to a plurality of Wi-Fi receiver chains is disclosed, the receiver module comprising: a controller module configured to: collect signal quality parameters from each of the plurality of Wi-Fi receiver chains; control a state of each of the receiver chains, by comparing the signal quality parameter level of each receiver chain with a predetermined signal quality parameter threshold; and turn off selectively, receiver chains that are in an "ON" state and having low signal quality parameters such that a total number of receiver chains that remain in an "ON" state is equal or less than a predetermined total number of receiver chains.

With regard to the first aspect of the invention, the signal quality parameters comprises at least one of a receiver signal strength indicator (RSSI), a signal-to-noise-ratio (SNR), or a correlation value.

With regard to the first aspect of the invention, the controlling of the state of each of the receiver chains comprises the controller module being further configured to: set an "ON" state for receiver chains having measured signal quality parameters that exceed a predetermined signal quality parameter threshold.

With regard to the first aspect of the invention, the controlling of the state of each of the receiver chains comprises the controller module being further configured to: set an "OFF" state for receiver chains having measured signal quality parameters that are less than a predetermined signal quality parameter threshold.

With regard to the first aspect of the invention, each of the Wi-Fi receiver chains comprises an antenna, an analogue chain, an analogue-to-digital converter, a synchronizer and filters, a Fast-Fourier-Transform module, an equalizer and demodulator, and a Forward-Error-Correction decoder.

With regard to the first aspect of the invention, the signal quality parameters comprise RSSI levels and the predetermined signal quality parameter threshold comprises a predetermined RSSI threshold between −50 dBM and −105 dBM.

According to a second aspect of the invention, a method for controlling a state of each of a plurality of Wi-Fi receiver chains that are coupled to a receiver module is disclosed, the method comprising: collecting, using the receiver module, signal quality parameters measured by each of the plurality of Wi-Fi receiver chains; controlling, using the receiver module, a state of each of the receiver chains, by comparing a signal quality parameter of each receiver chain with a predetermined signal quality parameter threshold; and turning off selectively, using the receiver module, receiver chains that are in an "ON" state and having low signal quality parameters such that a total number of receiver chains that remain in an "ON" state is equal or less than a predetermined total number of receiver chains.

With regard to the second aspect of the invention, the signal quality parameters comprises at least one of a receiver signal strength indicator (RSSI), a signal-to-noise-ratio (SNR), or a correlation value.

With regard to the second aspect of the invention, the controlling of the state of each of the receiver chains comprises: setting, using the receiver module, an "ON" state for receiver chains having measured RSSI levels that exceed a predetermined signal quality parameter threshold.

With regard to the second aspect of the invention, the controlling of the state of each of the receiver chains comprises: setting, using the receiver module, an "OFF" state for receiver chains having measured RSSI levels that are less than a predetermined signal quality parameter threshold.

With regard to the second aspect of the invention, each of the Wi-Fi receiver chains comprises an antenna, an analogue chain, an analogue-to-digital converter, a synchronizer and filters, a Fast-Fourier-Transform module, an equalizer and demodulator, and a Forward-Error-Correction decoder.

With regard to the second aspect of the invention, the signal quality parameters comprise RSSI levels and the predetermined signal quality parameter threshold comprises a predetermined RSSI threshold between −50 dBM and −105 dBM.

According to a third aspect of the invention, an integrated circuit, comprising: a plurality of Wi-Fi receiver chains coupled to a receiver module is disclosed, the integrated circuit comprising: a controller module configured to: collect signal quality parameters from each of the plurality of Wi-Fi receiver chains; control a state of each of the receiver chains, by comparing the signal quality parameter level of each receiver chain with a predetermined signal quality parameter threshold; and turn off selectively, receiver chains that are in an "ON" state and having low signal quality parameters such that a total number of receiver chains that remain in an "ON" state is equal or less than a predetermined total number of receiver chains.

With regard to the third aspect of the invention, the signal quality parameters comprise at least one of a receiver signal strength indicator (RSSI), a signal-to-noise-ratio (SNR), or a correlation value.

With regard to the third aspect of the invention, the controlling of the state of each of the receiver chains comprises the controller module being further configured to: set an "ON" state for receiver chains having measured signal quality parameters that exceed a predetermined signal quality parameter threshold.

With regard to the third aspect of the invention, the controlling of the state of each of the receiver chains comprises the controller module being further configured to: set an "OFF" state for receiver chains having measured signal quality parameters that are less than a predetermined signal quality parameter threshold.

With regard to the third aspect of the invention, each of the Wi-Fi receiver chains comprises an antenna, an analogue chain, an analogue-to-digital converter, a synchronizer and filters, a Fast-Fourier-Transform module, an equalizer and demodulator, and a Forward-Error-Correction decoder.

With regard to the third aspect of the invention, the signal quality parameters comprise RSSI levels and the predetermined signal quality parameter threshold comprises a predetermined RSSI threshold between −50 dBM and −105 dBM.

The above advantages are provided by embodiments of a device and method in accordance with the invention operating in the following manner.

BRIEF DESCRIPTION OF THE DRAWINGS

The above advantages and features in accordance with this invention are described in the following detailed description and are shown in the following drawings.

DETAILED DESCRIPTION

This invention relates to a digital receiver design for a Wi-Fi receiver. In particular, it relates to the decoding procedure of a Wi-Fi station (STA) receiver that has multiple antennas. This receiver design comprises a receiver module that is communicatively coupled to a plurality of Wi-Fi receiver chains of the receiver chip whereby the receiver module is configured to selectively switch the states of a plurality of Wi-Fi receiver chains between an "ON" state and an "OFF" state based on the signal quality parameters measured by each of these receiver chains.

One skilled in the art will recognize that when a receiver chain is in an "ON" state, this implies that the receiver chain is operating normally to receive signals transmitted from various access points. Conversely, when the receiver chain is in an "OFF" state, this implies that the receiver has been switched off, thereby it no longer consumes as much power as when the receiver chain is switched on and in normal operations.

Further, one skilled in the art will recognize that some functional units in this description have been labelled as modules throughout the specification. The person skilled in the art will also recognize that a module may be implemented as circuits, logic chips or any sort of discrete component. Still further, one skilled in the art will also recognize that a module may be implemented in software which may then be executed by a variety of processor architectures. In embodiments of the invention, a module may also comprise computer instructions or executable code that may instruct a computer processor to carry out a sequence of events based on instructions received. The choice of the implementation of the modules is left as a design choice to a person skilled in the art and does not limit the scope of this invention in any way.

Figure 1:
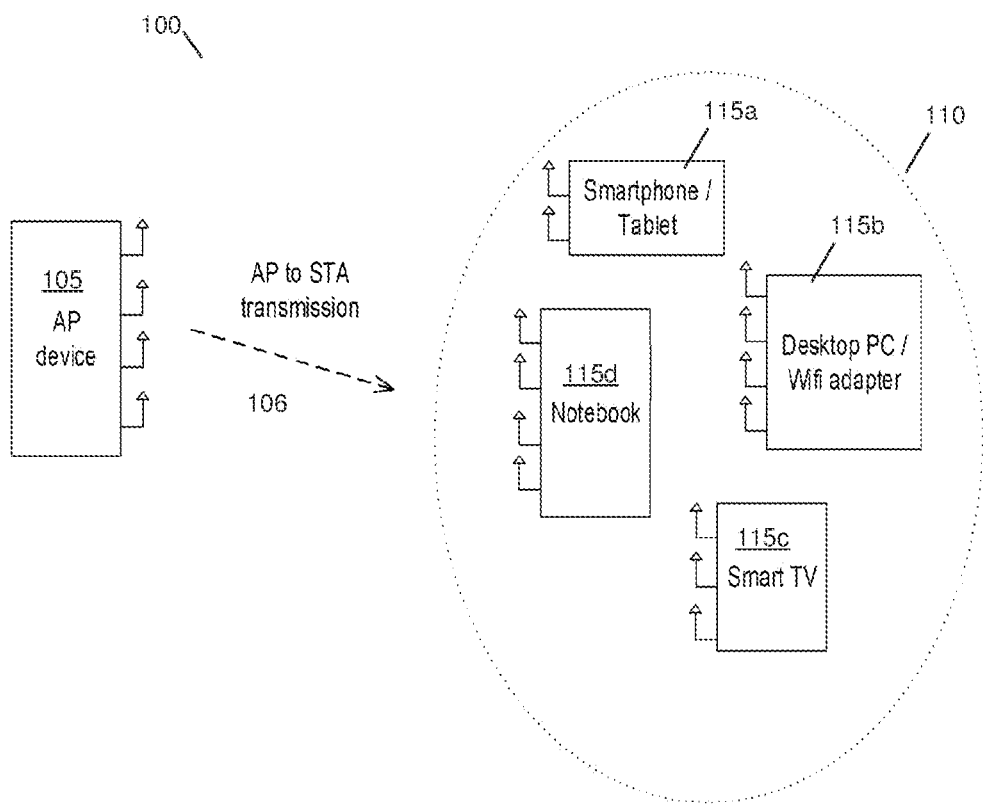
FIG. 1 illustrating a block diagram representative of a system that transmits and receives radio frequency transmissions in the WLAN and Wi-Fi frequency bands in accordance with embodiments of the invention.

FIG. 1 illustrates a block diagram representative of a system that transmits and receives radio frequency transmissions in the WLAN and Wi-Fi frequency bands. It should be noted that in the following description, the terms "WLAN" and "Wi-Fi" are used interchangeably to refer to a network for a device or devices that are configured to carry out wireless data transmission in the 2.4 GHz, 5 GHz, 6 GHz and/or 7 GHz frequency bands. In particular, system 100 includes an access point (AP) 105 that is configured to transmit Wi-Fi signals 106 to a plurality of Wi-Fi station (STA) devices 110 that are each configured with multiple receiver chains. Additionally, AP device 105 and each of devices 110 each have a transmitter/receiver module that are in communication with the respective transceivers to facilitate the exchange of data between the AP and the STAs.

As illustrated in FIG. 1, STA devices 110 may comprise smartphone/tablet 115a, desktop computer/Wi-Fi adapter 115b, smart television 115c and laptop/notebook 115d. One skilled in the art will recognize that STA devices 110 are not limited to just these devices and may include other types of electronics devices that utilize a plurality of receiver chains. Similarly, one skilled in the art will recognize that more than one AP device may be used and that these AP devices and STA devices may each comprise of any number of transmitter or receiver chains respectively without departing from the invention.

Figure 2:
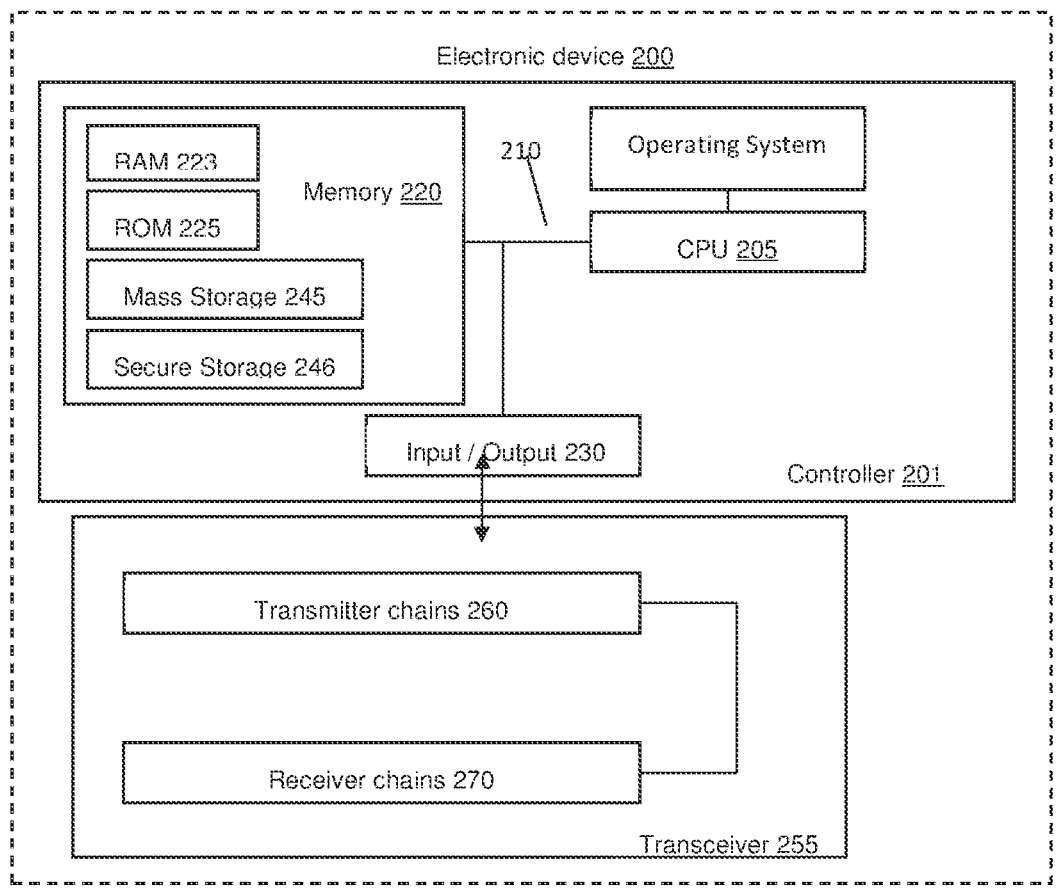
FIG. 2 illustrating a block diagram representative of components in an electronic module for implementing embodiments in accordance with embodiments of the invention.

FIG. 2 illustrates a block diagram representative of components of an electronic device 200 that is provided within the transmitter or receiver modules for implementing embodiments in accordance with embodiments of the invention. One skilled in the art will recognize that the exact configuration of each electronic device provided within the entities, or the server may be different and the exact configuration of electronic device 200 may vary and FIG. 2 is provided by way of example only.

In embodiments of the invention, device 200 comprises controller 201 and transceiver 255. Transceiver 255 is arranged to receive instructions from controller 201 and includes transmitter chains 260 and receiver chains 270 that are each configured to transmit and receive signals respectively.

Controller 201 is in data communication with transceiver 255 via a bus and controller 201 includes memory 220, Central Processing Unit (CPU) 205 mounted on a circuit board that processes instructions and data for performing the method of this embodiment, an operating system 206, an input/output (I/O) interface 230 for communicating with transceiver 255 and a communications interface. Wireless networks that may be utilized by the transmitter and receiver chains 260 and 270 include, but are not limited to, Wireless-Fidelity (Wi-Fi) in the 2.4 GHz and 5 GHz frequency bands at the very least, Bluetooth, Near Field Communication (NFC), cellular networks, satellite networks, telecommunication networks, Wide Area Networks (WAN) etc.

Memory 220 and operating system 206 are in data communication with CPU 205 via bus 210. The memory components include both volatile and non-volatile memory and more than one of each type of memory, including Random Access Memory (RAM) 220, Read Only Memory (ROM) 225 and a mass storage device 245, the last comprising one or more solid-state drives (SSDs). One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 220 may include a kernel and/or programming modules such as a software application that may be stored in either volatile or non-volatile memory.

Herein the term "CPU" is used to refer generically to any device or component that can process such instructions and may include: a microprocessor, microcontroller, programmable logic device or other computational device. That is, CPU 205 may be provided by any suitable logic circuitry for receiving inputs, processing them in accordance with instructions stored in memory and generating outputs (for example to the memory components or on display 240). In this embodiment, CPU 205 may be a single core or multi-core processor with memory addressable space. In one example, CPU 205 may be multi-core, comprising—for example—an 8 core CPU.

Referring back to FIG. 1, electronic device 200 may be provided within the receiver/transmitter modules in each of the STA devices 110 or in AP 105. In each of the STA devices 110, electronic device 200 may comprise a receiver module that is communicatively coupled to the plurality of receiver chains in each of STA devices 110.

Figure 3:
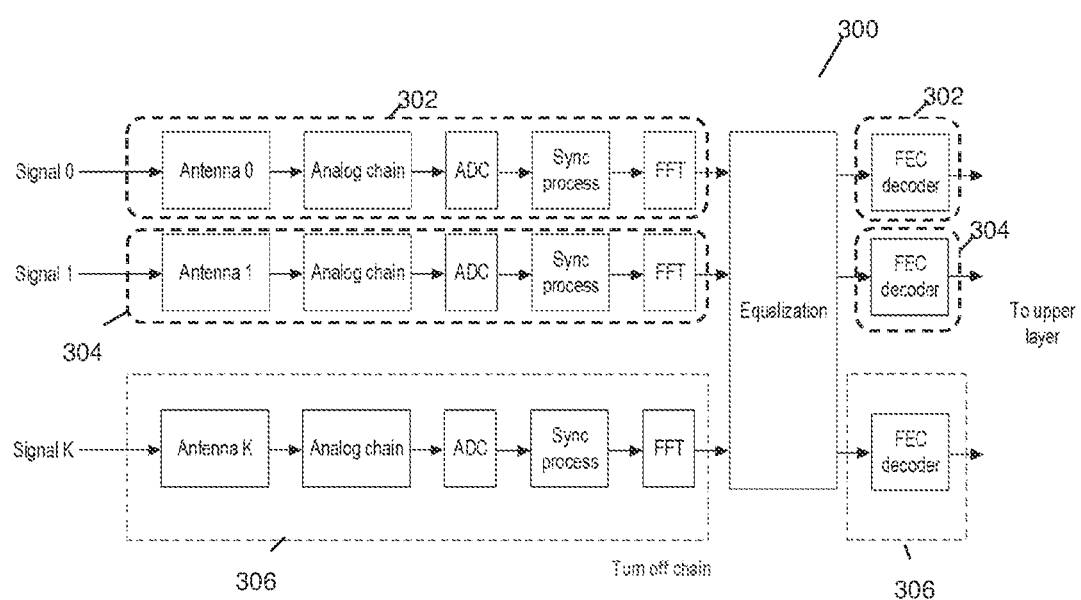
FIG. 3 illustrating a plurality of receiver chains in the PHY layer of a receiver module in accordance with embodiments of the invention.

An exemplary block diagram of a system of receiver chains that may be coupled to the receiver module is illustrated in FIG. 3. In particular, FIG. 3 illustrates system 300 which comprises receiver chains 302, 304 and up to receiver chain 306. As system 300 is configured to receive up to a K-number of signals, system 300 is provided with K-number of receiver chains. One skilled in the art will recognize that any number of receiver chains may be utilized without departing from the invention and that the system shown in FIG. 3 is used for illustration purposes. Each of these receiver chains include physical components such as, but are not limited to, an analogue chain, an analogue-to-digital converter, a synchronizer and filters, a Fast-Fourier-Transform module, an equalizer and demodulator, and a forward-error-correction decoder that connects to the upper layer of the receiver chip. The receiver module may be coupled to any component within the receiver chain as long as the receiver module is able to control the state of the receiver chain. By doing so, the receiver module is able to either turn off/on individual components within the receiver chain or alternatively, the receiver module may turn off/on all the components within the receiver chain at once.

In operation, each of these receiver chains 302, 304 to 306 is configured to measure the signal's power as received at the receiver chain. The measured power is then stored as the signal quality parameters for the receiver chain. In general, the greater the measured signal quality parameter, the greater the strength of the received signal. The receiver module then collects these signal quality parameters as measured by each of the plurality of receiver chains. In embodiments of the invention, the signal quality parameters may comprise, but are not limited to, at least one of receiver signal strength indicator (RSSI) levels, signal-to-noise-ratio (SNR) levels or correlation values. One skilled in the art will recognize that the correlation value is generally obtained when data from a preamble part of the Wi-Fi frame goes through a correlation operation.

One skilled in the art will recognize that while reference is made in the subsequent sections to an embodiment whereby the signal quality parameter comprises RSSI levels and the predetermined signal quality parameter threshold comprises a predetermined RSSI threshold, those skilled in the art will recognize that other types of signal quality parameters or other types of predetermined signal quality parameter thresholds may be used without departing from the invention. In this embodiment, the RSSI levels of these chains are then compared with a predetermined RSSI threshold that may vary between −50 dBm and −105 dBm. In embodiments of the invention, the receiver module will switch on, i.e., set to an "ON" state, receiver chains having measured RSSI levels that exceed or are equal to the predetermined RSSI threshold. The receiver module may then switch off, i.e., set to an "OFF" state, the remaining receiver chains that have measured RSSI levels that are less than the predetermined RSSI threshold. In another embodiment of the invention, the receiver module may instead be configured to directly switch off, i.e., set to an "OFF" state, receiver chains that have measured RSSI levels that are less than the predetermined RSSI threshold while leaving the remaining receiver chains in their original "ON" states. In other words, receiver chains that have low measured RSSI levels will be in an "OFF" state while receiver chains that have high measured RSSI levels will be in an "ON" state.

Once the receiver chains have been set to their respective "ON" or "OFF" states, the receiver module is then configured to selectively, turn off "ON" receiver chains that have the lower RSSI levels such that a total number of receiver chains that remain switched on is equal or less than a predetermined total number of receiver chains. Once this is done, the total number of receiver chains that remain switched on will be equal to, or less than the predetermined total number of receiver chains. In other words, if the number of receiver chains that are in an "ON" state exceed the predetermined total number of receiver chains, receiver chains that have low measured RSSI levels will be switched off until the number of receiver chains that remains switched on is equal to the predetermined total number of receiver chains.

When these receiver chains are turned off, there is the possibility that decoding failure may occur and a fall in signal throughput may occur. However, at such low RSSI levels, the fall in signal throughput would be barely noticeable as such, the overall performance of the receiver chip would not be greatly affected. Additionally, the period following the instance the affected receiver chains are turned off will not see a continued dramatic fall in throughput, as the transmitting access point would have adjusted the transmission rate accordingly to suit the new, reduced receiver decoding performance. Through these steps, the receiver chip would be able to achieve considerable power saving while maintaining a fairly constant signal throughput at the receiver chip whereby very little delay is required to invoke the power saving mode at the receiver chip.

The above is a description of embodiments of a module and a method in accordance with the present invention as set forth in the following claims. Whilst certain features of the invention have been illustrated and described herein, many modifications, substitutions, changes and equivalents will now occur to those of ordinary skill in the art. It is therefore to be understood that the appended claims are intended to cover all such modifications and changes as fall within the true spirit of the invention.

The invention claimed is:

1. A receiver coupled to a plurality of Wi-Fi receiver chains, the receiver comprising:
a controller configured to:
collect signal quality parameters from each of the plurality of Wi-Fi receiver chains, wherein each of the signal quality parameters comprises a signal quality parameter level;
control a state of each of the plurality of receiver chains, by comparing the signal quality parameter level of the receiver chain with a predetermined signal quality parameter threshold; and
selectively turn off, receiver chains that are in an "ON" state and have signal quality parameter levels that are lower than those of at least some of the other receiver chains among the plurality of receiver chains such that a total number of receiver chains that remain in an "ON" state is equal or less than a predetermined number, wherein the controlling of the state of each of the plurality of receiver chains comprises:
setting an "ON" state for receiver chains having measured signal quality parameter levels that exceed a predetermined signal quality parameter threshold.

2. The receiver according to claim 1 wherein each of the signal quality parameters comprises at least one of a receiver signal strength indicator (RSSI), a signal-to-noise-ratio (SNR), or a correlation value.

3. The receiver according to claim 1 wherein the controlling of the state of each of the plurality of receiver chains comprises:
setting an "OFF" state for receiver chains having measured signal quality parameter levels that are less than a predetermined signal quality parameter threshold.

4. The receiver according to claim 1 whereby each of the Wi-Fi receiver chains comprises an antenna, an analogue chain, an analogue-to-digital converter, a synchronizer and filters, a Fast-Fourier-Transform module, an equalizer and demodulator, and a Forward-Error-Correction decoder.

5. The receiver according to claim 2 whereby the signal quality parameters comprise RSSI levels and the predetermined signal quality parameter threshold comprises a predetermined RSSI threshold between −50 dBM and −105 dBM.

6. A method for controlling a state of each of a plurality of Wi-Fi receiver chains that are coupled to a receiver, the method comprising:
collecting, using the receiver, signal quality parameters measured by each of the plurality of Wi-Fi receiver chains, wherein each of the signal quality parameters comprises a signal quality parameter level;
controlling, using the receiver, a state of each of the plurality of receiver chains, by comparing the signal quality parameter of the receiver chain with a predetermined signal quality parameter threshold; and
turning off selectively, using the receiver, receiver chains that are in an "ON" state and have signal quality parameter levels that are lower than those of at least some of the other receiver chains among the plurality of receiver chains such that a total number of receiver chains that remain in an "ON" state is equal or less than a predetermined number wherein the controlling of the state of each of the plurality of receiver chains comprises:
setting, using the receiver, an "ON" state for receiver chains having measured RSSI levels that exceed a predetermined signal quality threshold.

7. The method according to claim 6 wherein each of the signal quality parameters comprises at least one of a receiver signal strength indicator (RSSI), a signal-to-noise-ratio (SNR), or a correlation value.

8. The method according to claim 6 wherein the controlling of the state of each of the plurality of receiver chains comprises:
setting, using the receiver, an "OFF" state for receiver chains having measured RSSI levels that are less than a predetermined signal quality parameter threshold.

9. The method according to claim 6 wherein each of the plurality of Wi-Fi receiver chains comprises an antenna, an analogue chain, an analogue-to-digital converter, a synchronizer and filters, a Fast-Fourier-Transform module, an equalizer and demodulator, and a Forward-Error-Correction decoder.

10. The method according to claim 6 wherein the signal quality parameters comprise RSSI levels and the predetermined signal quality parameter threshold comprises a predetermined RSSI threshold between −50 dBM and −105 dBM.

11. An integrated circuit, comprising: a plurality of Wi-Fi receiver chains coupled to a receiver; and
a controller configured to:
collect signal quality parameters from each of the plurality of Wi-Fi receiver chains, wherein each of the signal quality parameters comprises a signal quality parameter level;
control a state of each of the plurality of receiver chains, by comparing the signal quality parameter level of the receiver chain with a predetermined signal quality parameter threshold; and
turn off selectively, receiver chains that are in an "ON" state and have signal quality parameter levels that are lower than those of at least some of the other receiver chains among the plurality of receiver chains such that a total number of receiver chains that remain in an "ON" state is equal or less than a predetermined number, wherein the controlling of the state of each of the plurality of receiver chains comprises:
setting an "ON" state for receiver chains having measured signal quality parameter levels that exceed a predetermined signal quality parameter threshold.

12. The integrated circuit according to claim 11 wherein each of the signal quality parameters comprises at least one of a receiver signal strength indicator (RSSI), a signal-to-noise-ratio (SNR), or a correlation value.

13. The receiver according to claim 11 wherein the controlling of the state of each of the plurality of receiver chains comprises:
setting an "OFF" state for receiver chains having measured signal quality parameter levels that are less than a predetermined signal quality parameter threshold.

14. The receiver according to claim 11 wherein each of the plurality of Wi-Fi receiver chains comprises an antenna, an analogue chain, an analogue-to-digital converter, a synchronizer and filters, a Fast-Fourier-Transform module, an equalizer and demodulator, and a Forward-Error-Correction decoder.

15. The receiver according to claim 12 wherein the signal quality parameters comprise RSSI levels and the predetermined signal quality parameter threshold comprises a predetermined RSSI threshold between −50 dBM and −105 dBM.

16. The receiver according to claim 12 wherein the controlling of the state of each of the plurality of receiver chains comprises:
setting an "OFF" state for receiver chains having measured signal quality parameter levels that are less than a predetermined signal quality parameter threshold.

* * * * *

UNITED STATES PATENT AND TRADEMARK OFFICE
CERTIFICATE OF CORRECTION

| | | |
|---|---|---|
| PATENT NO. | : 12,471,024 B2 | Page 1 of 1 |
| APPLICATION NO. | : 18/173898 | |
| DATED | : November 11, 2025 | |
| INVENTOR(S) | : Huawei Yue et al. | |

It is certified that error appears in the above-identified patent and that said Letters Patent is hereby corrected as shown below:

In the Claims

Column 8, Claim 6, Line 54, change "quality threshold" to --quality parameter threshold--.

Signed and Sealed this
Ninth Day of December, 2025

John A. Squires
*Director of the United States Patent and Trademark Office*